United States Patent Office 2,764,610
Patented Sept. 25, 1956

2,764,610

PRODUCTION OF FORMATE ESTERS OF VINYL-CYCLOHEXENE AND THEIR DERIVATIVES

Robert C. Kuder, Toledo, Ohio, assignor, by mesne assignments, to Allied Chemical & Dye Corporation, New York, N. Y., a corporation of New York No Drawing. Application October 3, 1951, Serial No. 249,619

4 Claims. (Cl. 260—497)

The invention relates to the production of derivatives of vinylcyclohexene, including vinylcyclohexanols, as well as other valuable derivatives which are new chemical compounds.

United States Patent No. 2,513,179 discloses a process of preparing an alcohol from vinylcyclohexene by adding a molecule of acetic acid to a molecule of vinylcyclohexene to produce an acetate and then saponifying the acetate to liberate an alcohol. This process has a serious disadvantage in that the amount of vinylcyclohexene lost by polymerization during the reaction with acetic acid is substantially greater than the amount of vinylcyclohexene converted to the acetate.

The principal object of the invention is the economical production, in high yields, of vinylcyclohexanols, and other derivatives of vinylcyclohexene that are valuable new compounds. More specific objects and advantages are apparent from the description, which illustrates and discloses but is not intended to limit the scope of the invention.

The reaction of acetic acid with vinylcyclohexene requires a strongly acidic catalyst, such as sulfuric acid, hydrofluoric acid or boron fluoride diethyl ether complex. The present invention is based upon the discovery that the reaction of formic acid with vinylcyclohexene is unique in that it proceeds in the absence of a strongly acidic catalyst, and upon the further discovery that such reaction proceeds very readily in the absence of an acidic catalyst to give yields that are substantially higher than the yields that can be obtained by reacting formic acid with vinylcyclohexene in the presence of a strongly acidic catalyst of the type generally required to cause carboxylic acids to react with olefines.

The novel compounds embodying the invention that can be produced in high yields by the present method include 3-vinylcyclohexyl formate, 4-vinylcyclohexyl formate, 3-($\alpha$-formoxyethyl)cyclohexyl formate and 4-($\alpha$-formoxyethyl)cyclohexyl formate. These novel compounds are unexpectedly different from the corresponding acetates in that they are formed in the absence of a strongly acidic catalyst, and it is this unexpected property of these novel formates that makes them commercially useful materials rather than expensive laboratory curiosities. The first two of these formates are valuable for the production of vinylcyclohexanols, which can be obtained by saponification of such formates.

The low cost of producing 3-($\alpha$-formoxyethyl)cyclohexyl formate and 4-($\alpha$-formoxyethyl)cyclohexyl formate by the present method makes it feasible to produce, by saponification of such substances, 3-($\alpha$-hydroxyethyl)cyclohexanol and 4-($\alpha$-hydroxyethyl)cyclohexanol, which are highly useful dihydric alcohols. The former of these two dihydric alcohols is a new chemical compound embodying the invention.

It has been demonstrated that in the reaction of formic acid with vinylcyclohexene the yield is substantially increased by omission of the usual strongly acidic catalyst, whereas the reaction of acetic acid with vinylcyclohexene does not proceed in the absence of such a catalyst. This demonstration was carried out as follows:

A mixture of vinylcyclohexene (1 mol) and 98 per cent formic acid (3 mols) in a 500 ml. flask fitted with a thermometer and a reflux condenser was refluxed without stirring for eight hours at temperatures ranging between 94 and 97 degrees C. The reaction mixture was then distilled under reduced pressure to obtain unreacted vinylcyclohexene and formic acid and the following products: a water-white mobile liquid fraction boiling in the range between 197 and 199 degrees C. at 740 mm. Hg, having a specific gravity, i. e., density at 20 degrees C. compared with that of water at 4 degrees C. ($d_4^{20}$) of 0.982; and having an index of refraction at 25 degrees C. ($n_D^{25}$) of 1.460, which was a mixture of the isomeric monoformates 3-vinylcyclohexyl formate and 4-vinylcyclohexyl formate; and a light yellow liquid fraction, B. P. 93 to 97 degrees C. at 1 mm. Hg; $d_4^{20}$ 1.053; $n_D^{25}$ 1.477; which was a mixture comprising the isomeric diformates 3-($\alpha$-formoxyethyl)cyclohexyl formate and 4-($\alpha$-formoxyethyl)-cyclohexyl formate and a small amount of polymeric material. The residue comprised higher boiling polymers of vinylcyclohexene.

The first fraction represented a 27 per cent conversion of the vinylcyclohexene to monoformates. The second fraction and the higher boiling residue represented about a 17 per cent conversion to diformates and polymeric material. (The term "per cent" conversion is used herein to mean mol per cent based on the number of mols of vinylcyclohexene charged.) The actual yields of formates (i. e., the per cent conversion based on the mols of vinylcyclohexene that were not recovered as such and had apparently undergone reaction) were considerably higher than the conversion. For example, approximately 56 per cent of the vinylcyclohexene was recovered. Thus, the actual yield of the monoformates based on the 44 per cent of vinylcyclohexene that had reacted was 61 per cent.

When the reaction described above was repeated except that a catalyst (0.08 mol of boron fluoride acetic acid complex) was incorporated in the reaction mixture at the start of the reaction, and the refluxing was carried out with stirring for three hours at 70 to 75 degrees C., the total conversion to monoformates was only 22 per cent, and since no unreacted vinylcyclohexene was recovered, the total yield was also only 22 per cent.

A mixture of vinylcyclohexene (1 mol), glacial acetic acid (3 mols) and a catalyst (20 grams of boron fluoride acetic acid complex) was heated at temperatures ranging between 70 and 75 degrees C. for eight hours in a 500 ml. flask fitted with a thermometer and a reflux condenser. The reaction mixture was then poured into water (600 cc.) in a separatory funnel, and the upper layer was removed, washed free of acid and dried over calcium chloride. The material was then filtered from the calcium chloride, and the filtrate was distilled to obtain, in addition to unreacted vinylcyclohexene, a mixture of vinylcyclohexyl monoacetates, boiling within the range between 90 and 94 degrees C. at 11 mm. Hg, and a higher boiling fraction comprising mainly polymers of vinylcyclohexene. The first fraction represented a 26 percent conversion of the vinylcyclohexene to monoacetates and the second fraction represented about a 44 percent conversion to higher boiling material. The actual yield of monoacetates based on the 70 percent of vinylcyclohexene that had reacted was only about 37 percent. When the procedure was repeated, except that the catalyst was omitted, no reaction took place.

Thus, it was demonstrated that although the reaction of an olefin such as vinylcyclohexene with a carboxylic acid such as acetic acid has been carried out successfully heretofore only in the presence of a strongly acidic catalyst, high yields of vinylcyclohexyl formates are obtained by reacting vinylcyclohexene with formic acid in accordance with the present method in the absence of such a catalyst. The term "strongly acidic catalyst" is used herein to include the acid catalysts that are ordinarily used for esterification reactions, such as the strong mineral acids, e. g., hydrochloric, sulfuric and phosphoric acids; sulfonic acids such as methane sulfonic acid, ethane sulfonic acid, p-toluene sulfonic acid and benzene sulfonic acid; the bisulfates of sodium and potassium; aluminum sulfate; hydrofluoric acid and its complexes such as fluoboric acid; and Friedel-Crafts catalysts that are derived from strong acids, such as hydrochloric, hydrofluoric and hydrobromic acids, and their complexes, e. g., aluminum chloride, boron chloride and, particularly, boron fluoride and boron fluoride diethyl etherate, which have been used in the direct esterification of acids with olefins. It is believed that a catalyst of the type which forms complexes (e. g., aluminum chloride or boron fluoride) reacts with an olefin such as vinylcyclohexene to form a positive complex, and that, upon reaction of this complex with an acid such as formic acid, the olefin is liberated as part of the acid ester. Therefore, the present reaction is carried out in the absence of a catalyst of such strong acidity that it forms a complex with the vinylcyclohexene.

PRODUCTION OF FORMATES

The production of formates by the present method is carried out by reacting vinylcyclohexene and formic acid in the absence of a strongly acidic catalyst.

The term "vinylcyclohexene" is used herein to mean the readily available 4-vinylcyclohexene-1. The reaction between vinylcyclohexene and formic acid is preferably carried out at atmospheric pressure. Although the reaction may be conducted at ordinary atmospheric temperatures, the time required to obtain even a small yield of formates is ordinarily too long to be practical. On the other hand, although the rate of reaction increases at higher temperatures, care must be taken to avoid a reaction temperature higher than that at which formic acid decomposes (i. e., higher than about 140 degrees C.). In general, a very satisfactory yield can be obtained within a relatively short time by conducting the reaction at reflux temperatures (approximately 90 to 105 degrees C.).

Although the reaction time may be as short as one hour, the yield is proportionately increased with longer reaction times. However, no substantial increase in yield is obtained by the use of a reaction time longer than about eight hours, and the reaction cannot be driven to completion by the use of an extended reaction time. In general, it is preferable that the reaction time be at least two hours and it is desirable that it be from four to six hours in order to obtain a good conversion in a reasonable length of time.

It is preferable that the formic acid employed be essentially anhydrous (e. g., that it contain not more than about 2 percent by weight of water), and it is impractical to conduct the reaction with formic acid that comprises more than about 10 percent water by weight.

Although a molar excess of vinylcyclohexene may be used in the present method, e. g., as much as 2 mols of vinylcyclohexene per mol of formic acid, better yields are obtained when the molar ratio of vinylcyclohexene to formic acid is not higher than 1:1. In fact, the yields are considerably increased by using a molar excess of formic acid rather than an excess of vinylcyclohexene. It is preferable to use at least 2 mols of formic acid per mol of vinylcyclohexene, and it is most desirable to use from 3 to 4 mols of formic acid per mol of vinylcyclohexene. Although the product obtained using mol ratios of the reactants within the above ranges comprises predominantly monoformates, an appreciable proportion of the product comprises diformates, this proportion increasing of course, with the higher molar ratios of formic acid to vinylcyclohexene. When it is desirable that the product comprise predominantly diformates, an even larger excess of formic acid may be employed, e. g., 6 to 10 or more mols of formic acid per mol of vinylcyclohexene.

The reactants are not miscible even at the reflux temperature, but stirring does not increase the conversion, and the use of cosolvents such as dioxane or acetic acid actually decreases the conversion.

When the reaction is conducted as a batch process, under the conditions which, in general give optimum yields of vinylcyclohexyl formates (e. g., refluxing 2 to 4 mols of formic acid per mol of vinylcyclohexene for about six hours), approximately 45 to 70 per cent of the vinylcyclohexene is usually recovered unreacted. (It is believed that the reaction cannot be driven to completion because the concentration of the formic acid layer decreases too much for further reaction.) Approximately 20 to 36 per cent of the vinylcyclohexene is converted to vinylcyclohexyl monoformates and approximately 10 to 19 per cent is converted to vinylcyclohexyl diformates and to polymers of vinylcyclohexene. Thus, the actual yield of formates is considerably higher than the conversion, e. g. approximately twice the conversion. Since most of the vinylcyclohexene that is not converted to esters can be recovered and recycled, the present method for producing formates is preferably conducted as a continuous process, in which the yields of formates are 65 per cent or higher.

The formates produced in accordance with the present method are new chemical compounds which can be used in the production of substituted cyclohexanols such as vinylcyclohexanols and hydroxyethylcyclohexanols. These compounds of the invention include the monoformates, 3-vinylcyclohexyl formate and 4-vinylcyclohexyl formate, and the diformates, 3-($\alpha$-formoxyethyl)cyclohexyl formate and 4-($\alpha$-formoxyethyl)cyclohexyl formate.

SAPONIFICATION OF FORMATES

Substituted cyclohexanols are produced by the method of the invention which comprises reacting vinylcyclohexene and formic acid in the absence of a strongly acid catalyst, and then saponifying the reaction product. For example, vinylcyclohexanols, which are useful as solvents and as chemical intermediates for the preparation of other products, are produced by reacting one mol of vinylcyclohexene with one mol of formic acid in the absence of a strongly acidic catalyst, by the procedure hereinbefore described, and then saponifying the reaction product. The term "reacting one mol of vinylcyclohexene with one mol of formic acid" is used herein to indicate the mol ratio in which these substances actually react, and not the proportions of the reactants employed as starting materials. Thus, the proportions of the starting materials employed are such as to yield monoformates, as hereinbefore described, i. e., products of the reaction of one mol of formic acid per mol of vinylcyclohenene.

Similarly, the term "reacting one mol of vinylcyclohexene with two mols of formic acid" is used herein to indicate that the proportions employed are such as to yield the product of the reaction of two mols of formic acid per mol of vinylcyclohexene, i. e., diformates. Saponification of the diformates yields dihydric alcohols or glycols which can be used in the production of synthetic resins by reaction with polybasic acids. Thus, hydroxyethylcyclohexanols are produced by reacting one mol of vinylcyclohexene with two mols of formic acid in the absence of a strongly acid catalyst, and then saponifying the reaction product.

The saponification of the vinylcyclohexyl formates and diformates of the invention to the corresponding alcohols in accordance with the method of the invention is carried out simply by refluxing the formates or diformates with an aqueous solution of sodium hydroxide or potassium hydroxide. The saponification may be accomplished in essentially quantitative yields, the refluxing time required depending, of course, upon the volume to be saponified and the concentration of the base, but usually ranging between one and eight hours. In general, it is desirable to use an excess of the base over that which is theoretically required to obtain a quantitative yield of the alcohol, e. g., from 10 to 100 per cent excess. Usually it is desirable to use a fairly concentrated aqueous solution of the base, e. g., a 25 per cent solution, not only to shorten the time of reaction, but also to reduce the volume required of the base.

The following examples illustrate the practice of the invention.

*Example 1*

Vinylcyclohexyl formates embodying the invention are produced in accordance with the present method by the following procedure:

Vinylcyclohexene and 98 per cent formic acid are reacted in a flask fitted with a thermometer and a reflux condenser in a series of 4 runs. Table 1 below more specifically describes the runs by specifying the number of mols of formic acid (column 1), the number of mols of vinylcyclohexene (VCH) (column 2), the reaction temperature (column 3) and the reaction time (column 4). In each run, after recovering unreacted vinylcyclohexene and formic acid, there is obtained a fraction that is a mixture of the isomeric 3- and 4-vinylcyclohexyl formates. The residue is a mixture of the isomeric 3- and 4-($\alpha$-formoxyethyl)cyclohexyl formates and higher boiling polymers of vinylcyclohexene. The per cent of vinylcyclohexene that is recovered is shown in column 5 of Table 1; the per cent conversion of vinylcyclohexene to the monoformates is shown in column 6 and the per cent conversion of vinylcyclohexene to the diformates (including polymers) is shown in column 7. (The diformates and small amounts of low boiling polymers of vinylcyclohexene generally comprise about 40 per cent of the value given in column 7, the remainder being higher boiling polymers of vinylcyclohexene.) No catalyst is employed in any of the runs. The reaction mixture is stirred during the refluxing in run 1, but in the other runs the mixtures are refluxed without stirring.

TABLE I

| Col. | 1 | 2 | 3 | 4 | 5 | 6 | 7 |
|---|---|---|---|---|---|---|---|
| Run | HCOOH (mols) | VCH (mols) | Temp. (° C.) | Time (hrs.) | Unreacted VCH (mol per cent) | Percent Conv. to monoformates | Percent Conv. to diformates |
| 1 | ½ | 1 | 92 | 8 | 89 | 4 | 7 |
| 2 | 2 | 1 | 95–96 | 20 | 60 | 22 | 18 |
| 3 | 4 | 1 | 102–104 | 8 | 45 | 36 | 19 |
| 4 | 14 | 7 | 95 | 8 | 70 | 20 | 10 |

*Example 2*

Vinylcyclohexanols are produced in accordance with the present method by the following procedure:

A mixture of 3-vinylcyclohexyl formate and 4-vinylcyclohexyl formate, prepared as hereinbefore described, (231 grams) and an aqueous solution (480 grams) comprising 25 per cent by weight of sodium hydroxide is refluxed with stirring for seven and one-half hours. The reaction mixture is then cooled and separated into two layers in a separatory funnel. The top layer is distilled under reduced pressure through an 8 inch Vigreux column to obtain a water-white liquid (175 grams) insoluble in water, having an odor similar to that of cyclohexanol, B. P. 76 to 77 degrees C. at 6 mm. Hg; $n_D^{25}$ 1.478; $d_4^{20}$ 0.946; which is a mixture of 3- and 4-vinylcyclohexanols.

*Example 3*

Hydroxyethylcyclohexanols are produced in accordance with the present method by the following procedure:

A mixture comprising the isomeric 3- and 4-($\alpha$-formoxyethyl)cyclohexyl formates, prepared as hereinbefore described, (890 grams) is refluxed at 110 degrees C. with an aqueous solution (2112 grams) comprising 25 per cent by weight of sodium hydroxide for seven hours. The reaction mixture is then cooled and separated into three layers in a separatory funnel. The middle layer (545 grams) is distilled under reduced pressure to obtain a water-white extremely viscous liquid (418 grams), soluble in water, B. P. 108 to 109 degrees C. at 1 mm. Hg; $n_D^{24}$ 1.494; which is a mixture of 3- and 4-($\alpha$-hydroxyethyl)cyclohexanols. (The top layer, 204 grams, is a low-boiling polymer of vinylcyclohexene, apparently present as an impurity in the diformate starting material.)

Having described the invention, I claim:

1. A method of producing formates that comprises heating at a temperature below 140° C., and in the absence of any esterification catalyst, a mixture comprising vinylcyclohexene and concentrated formic acid comprising not more than 10% by weight thereof, of water.

2. A method of producing formates that comprises reacting at a temperature below 140° C., and in the absence of any esterification catalyst, a mixture consisting of 4-vinylcyclohexene-1, formic acid and not more than 10% by weight, based on said formic acid, of water, the molar ratio of vinylcyclohexene to formic acid being not more than 2:1 nor less than 1:10.

3. A method of producing 3-vinyl- and 4-vinylcyclohexanols that comprises reacting at a temperature below 140° C., and in the absence of any esterification catalyst, a mixture consisting of 4-vinylcyclohexene-1, formic acid and not more than 10% by weight, based on said formic acid, of water, the molar ratio of vinylcyclohexene to formic acid being not more than 2:1 nor less than 1:10, and then saponifying the resulting reaction product.

4. The method of producing monoformates that comprises reacting under reflux conditions below a temperature of 140° C., and in the absence of any esterification catalyst, a mixture consisting of 4-vinylcyclohexene-1, formic acid and not more than 2% by weight, based on the said formic acid, of water, the molar ratio of vinylcyclohexene to formic acid being not more than 1:1 and not less than 1:4.

References Cited in the file of this patent

UNITED STATES PATENTS

| | | |
|---|---|---|
| 2,317,949 | Burk | Apr. 27, 1943 |
| 2,500,599 | Bergsteinsson et al. | Mar. 14, 1950 |
| 2,598,263 | Johnson | May 27, 1952 |